United States Patent [19]

Khan et al.

[11] Patent Number: 5,305,452
[45] Date of Patent: Apr. 19, 1994

[54] BUS CONTROLLER WITH DIFFERENT MICROPROCESSOR AND BUS CLOCKS AND EMULATION OF DIFFERENT MICROPROCESSOR COMMAND SEQUENCES

[75] Inventors: Rashid N. Khan, San Jose; Robert W. Catlin, Santa Clara; Jefferson E. Owen, Fremont, all of Calif.

[73] Assignee: Chips and Technologies, Inc., San Jose, Calif.

[21] Appl. No.: 600,297

[22] Filed: Oct. 15, 1990

Related U.S. Application Data

[63] Continuation of Ser. No. 112,962, Oct. 23, 1987, abandoned.

[51] Int. Cl.⁵ .............................................. G06F 1/04
[52] U.S. Cl. .................................. 395/550; 364/240.5; 364/271; 364/270.3; 364/DIG. 1; 395/500
[58] Field of Search ............... 395/550, 500, 275

[56] References Cited

U.S. PATENT DOCUMENTS

| | | | |
|---|---|---|---|
| 3,974,479 | 8/1976 | Kotok | 364/200 |
| 3,984,812 | 10/1976 | Dahlberg | 364/200 |
| 4,218,754 | 8/1980 | Schaeffer | 364/900 |
| 4,257,095 | 3/1981 | Nadir | 364/200 |
| 4,366,540 | 12/1982 | Berglund | 364/200 |
| 4,414,664 | 11/1983 | Greenwood | 364/200 |
| 4,435,757 | 3/1984 | Pross | 364/200 |
| 4,438,488 | 3/1984 | Shibayama | 364/200 |
| 4,486,833 | 12/1984 | Daudelin | 364/200 |
| 4,509,120 | 4/1985 | Daudelin | 364/200 |
| 4,519,028 | 5/1985 | Olsen et al. | 364/200 |
| 4,654,655 | 3/1987 | Kowalski | 340/825.5 |
| 4,727,491 | 2/1988 | Culley | 364/200 |
| 4,750,111 | 6/1988 | Crosby, Jr. et al. | 364/200 |
| 4,819,164 | 4/1989 | Branson | 364/200 |
| 4,835,681 | 5/1989 | Culley | 364/200 |
| 5,086,500 | 2/1992 | Greub | 395/550 |

OTHER PUBLICATIONS

82A306 Pin Description, CHIPS, pp. 22–41, 82C301 Bus Controller.
"Inside the PC's Three Bus Interface Designs for the PC" James R. Drummond, *Byte*, Sep. 1987, p. 225.

*Primary Examiner*—Eric Coleman
*Attorney, Agent, or Firm*—Townsend and Townsend Khourie and Crew

[57] ABSTRACT

The present invention provides a system whereby the microprocessor and the bus controller in a personal computer can be driven at different frequencies. Furthermore with the present invention the COMMAND DELAY and the WAIT STATE signals on the bus can be adjusted under program control.

9 Claims, 4 Drawing Sheets

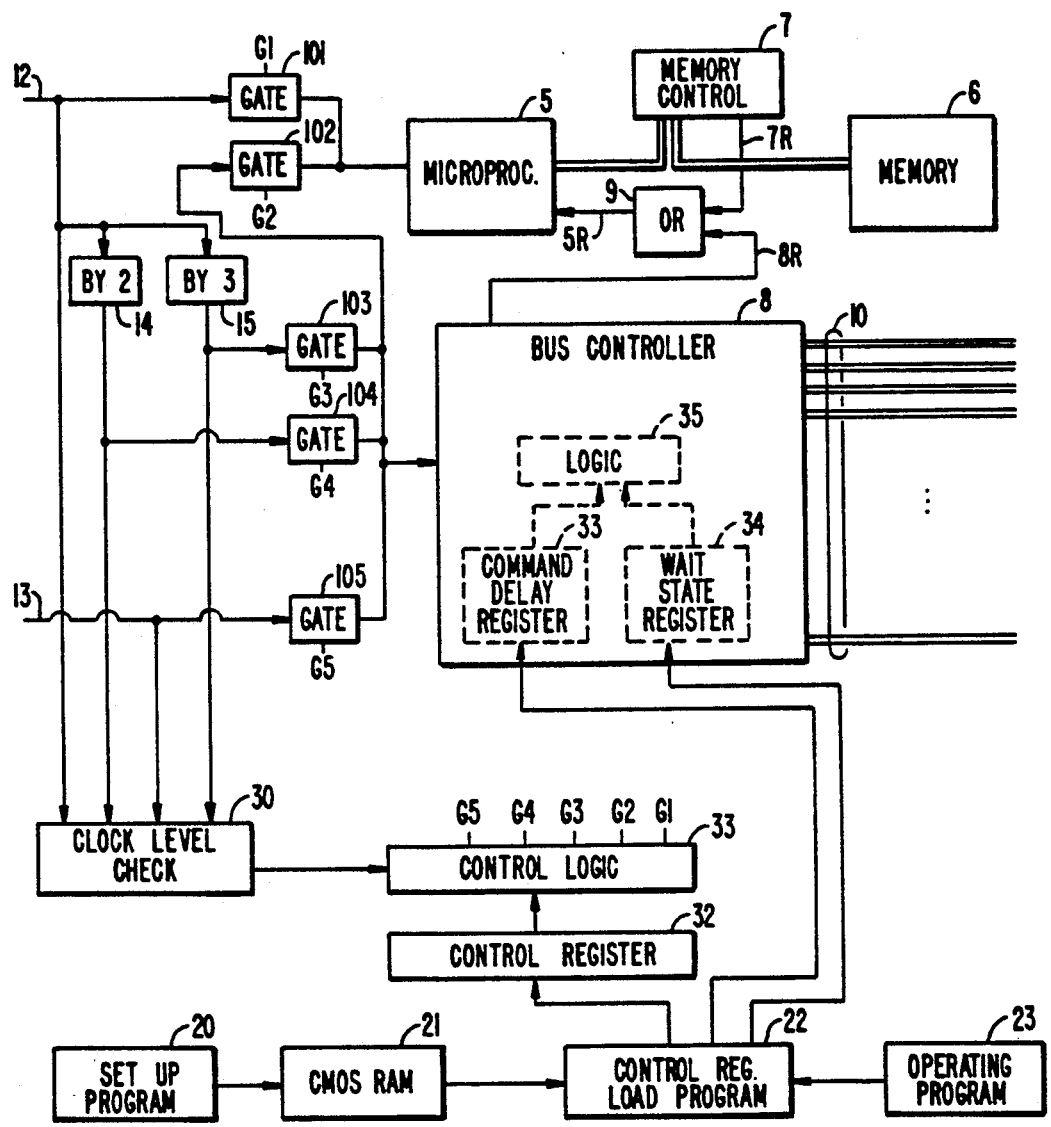
FIG._1.

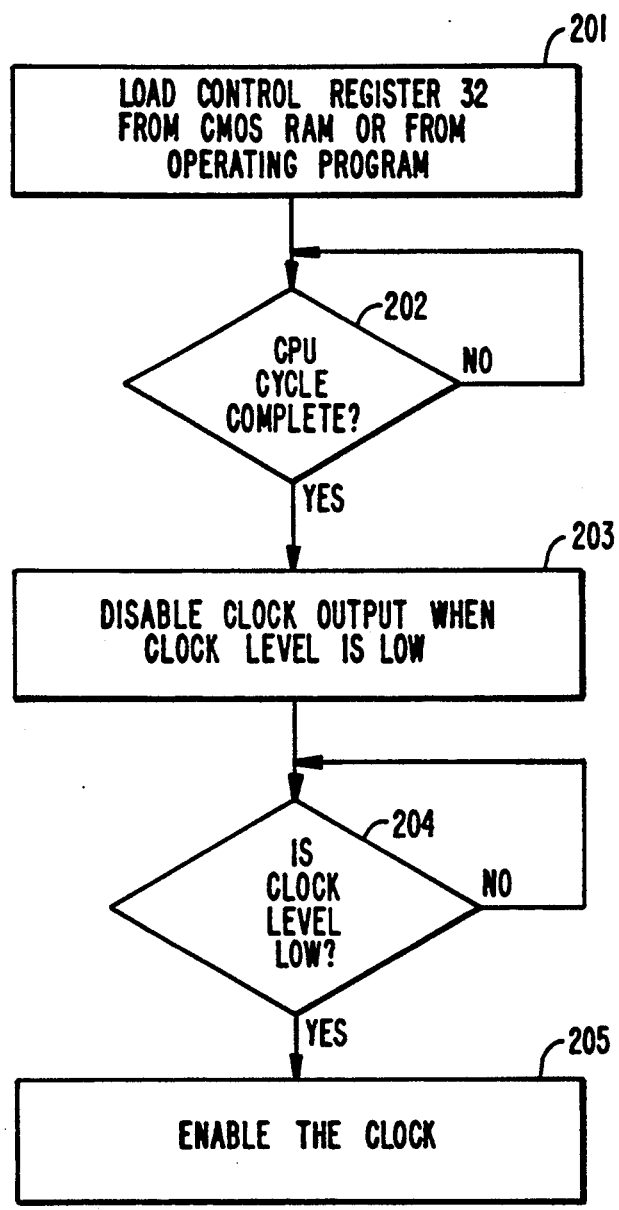
FIG._2.

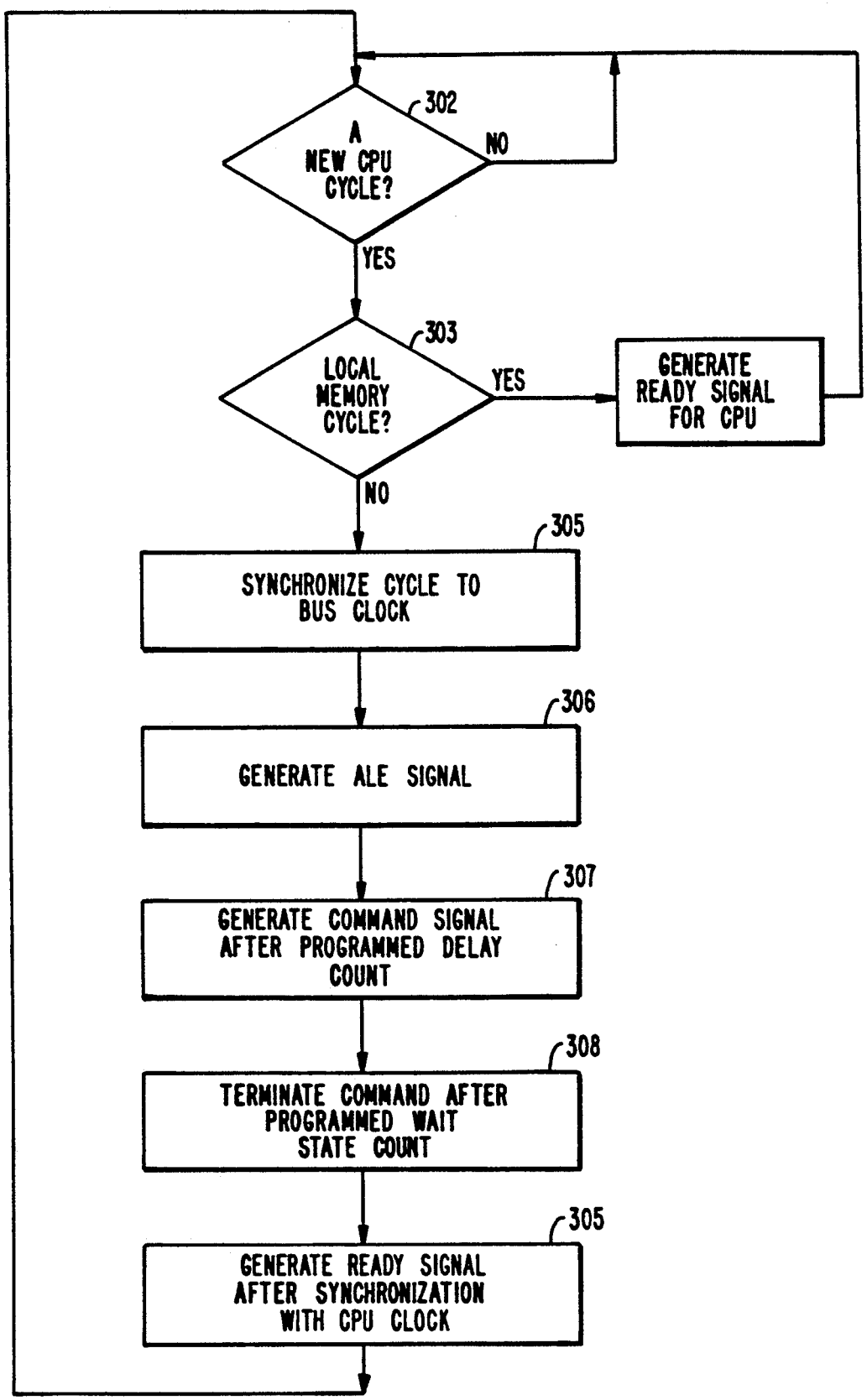
FIG._3.

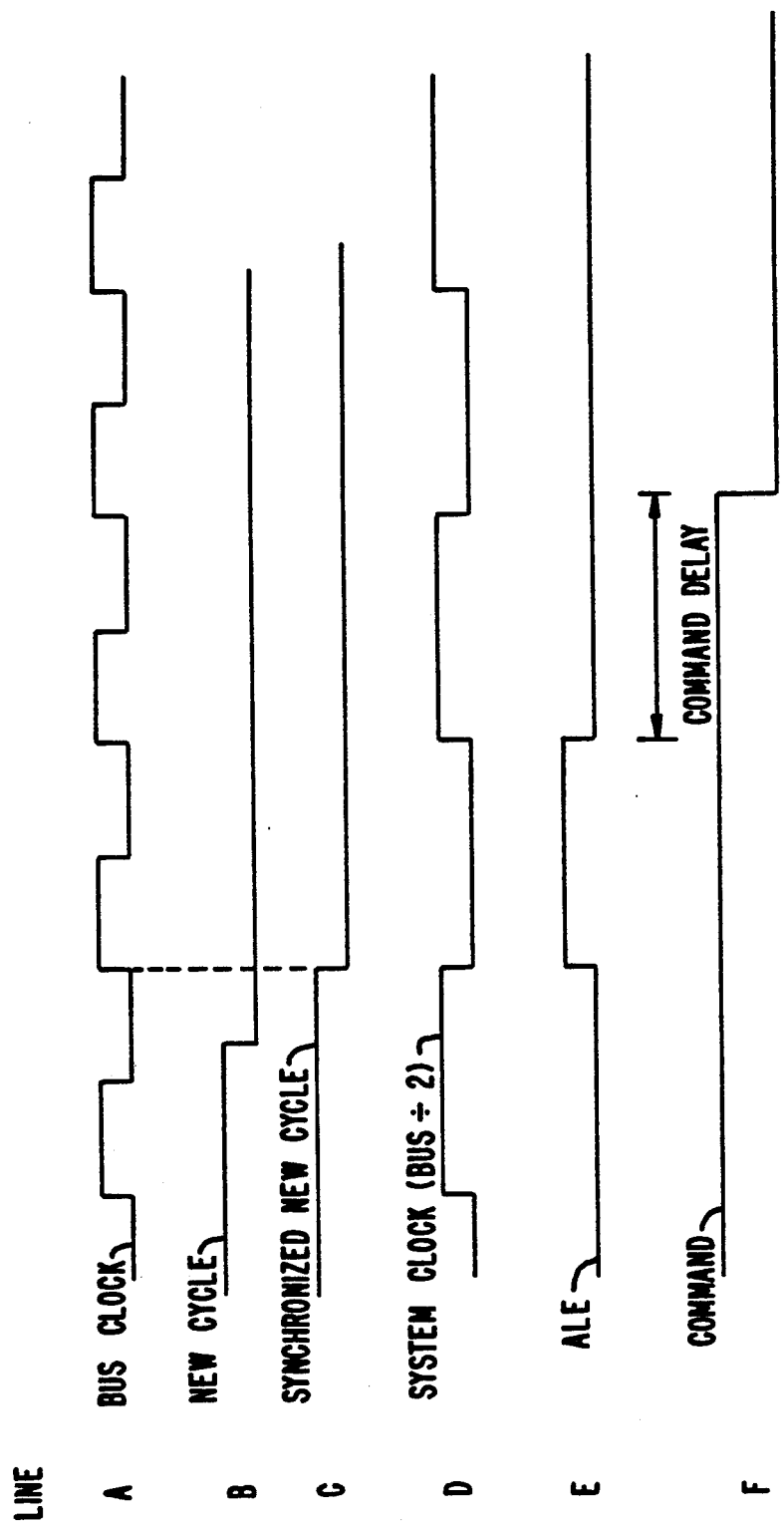
FIG._4.

BUS CONTROLLER WITH DIFFERENT MICROPROCESSOR AND BUS CLOCKS AND EMULATION OF DIFFERENT MICROPROCESSOR COMMAND SEQUENCES

This is a continuation of application Ser. No. 07/112,962, filed Oct. 23, 1987, now abandoned.

BACKGROUND OF THE INVENTION

1. Technical Field

The present invention relates to digital computers and more particularly to a system for timing the signals on the I-O bus of a personal computer.

2. Prior Art

Many of the personal computers which are presently available utilize an 80286 microprocessor. Personal computers which utilize an 80286 microprocessor generally have an I-O bus which is controlled by an 82-288 bus controller chip. Other presently available personal computers utilize an 80386 microprocessor. Personal computers which utilize an 80386 microprocessor generally have discrete logic associated therewith which controls the associated I-O bus.

In existing computers which utilize 80286 or 80386 microprocesors the same clock signal drives both the microprocessor and the bus controller. If for example a personal computer utilizes an 80286 microprocessor which is driven at six megahertz the associated 82-288 bus controller is also driven at six megahertz. Some existing personal computers can be switched between two clock frequencies; However, in such computers when the clock driving the microprocessor is switched, the clock driving the bus controller is also switched.

The bus controllers used in personal computers generate a series of standard signals. The signals on a PC bus are, for example, described in an article entitled "Three Bus Interface Designs for the PC", which appeared in *BYTE The Small Systems Journal*, Volume 12, Number 12, pages 225 to 245, 1987. The signals present in what is known as the AT Bus are described in many publications including a publication entitled the "IBM AT Technical Reference Manual" which is commercially available from IBM.

Among the signals on both the PC and the AT bus, are signals termed the COMMAND signal and the ADDRESS LATCH ENABLE (or ALE) signal. The COMMAND signal occurs at a specified time after the ALE signal. The time between the ALE signal and the COMMAND signal is termed the COMMAND DELAY. In the PC bus the COMMAND DELAY has a fixed value equal to ONE. In the AT bus the COMMAND delay has a value of "one" when an eight bit memory I-O bus is being used, and a value of "zero" when a sixteen bit memory bus is being used.

In both the PC bus and the AT bus, a COMMAND signal is terminated after a period of time known as the WAIT STATE DELAY. In the PC bus the WAIT STATE DELAY has one fixed value. In the AT bus the WAIT STATE DELAY has a value of "four" for eight bit cycles and a value of "one" for sixteen bit cycles.

The bus systems for present PC and AT systems are relatively inflexible because the COMMAND DELAY and the WAIT STATE DELAY have fixed values that are dictated by the machine designers. Furthermore the microprocessor clock, the bus clock, the COMMAND DELAY, and the WAIT STATE DELAY are all tied to the frequency of a single clock. This lack of flexibility in presently available Personal Computers creates problems with various devices such as with slower operating device. In general a system clock speed must be selected which accommodates the slowest device.

An article entitled "Three Bus Interface Designs for the PC", which was published in *BYTE The Small Systems Journal*, Volume 12, Number 12, 1987, discusses bus timing and it makes the observation that cards designed to work on a personal computer with one clock speed may not work on a processor with a different clock speed. This article suggests that the solution is to use high speed chips whenever possible. Such a solution may be overly expensive to implement.

OBJECTS OF THE INVENTION

An object of the present invention is to provide a more flexible timing arrangement for the I-O bus in a personal computer.

Another object of the present invention is to provide a system wherein the bus controller can be driven at a different frequency than the microprocessor.

Yet another object of the present invention is to provide a Personal Computer system where the timing of the bus and the processor can be tuned under program control to meet the optimum requirements of various configurations.

A still further object of the present invention is to provide a system which facilitates switching between different frequency signals.

SUMMARY OF THE INVENTION

The present invention provides a system whereby the microprocessor and the bus controller in a personal computer can be driven at different frequencies. Furthermore with the present invention the COMMAND DELAY and the WAIT STATE signals on the bus can be adjusted under program control.

The frequency at which the bus controller is driven can be derived from the clock which drives the microprocessor or it can be synchronized with an external source. The drive signal for the bus controller can be switched under program control. Likewise the frequency of the clock which drives the microprocessor can be changed under program control.

BRIEF DESCRIPTION OF THE DRAWINGS

FIG. 1 is a logical block diagram of a system which implements the present invention.

FIG. 2 is a flow diagram illustrating the operation of the clock synchronization logic.

FIG. 3 is a flow diagram of the logic that generates the READY signal.

FIG. 4 is a timing diagram.

DESCRIPTION OF THE PREFERRED EMBODIMENT

As shown in FIG. 1, the specific embodiment of the invention shown herein includes a microprocessor 5, a memory 6, a memory controller 7, a bus controller 8, and an I-O bus 10. The microprocessor 5 can be a commercially available 80-286 microprocessor, memory 6 can be conventional 256K or 1 Meg DRAMS, and memory controller 7 can be a conventional memory controller. The I-O bus 10 can be a conventional PC or AT bus.

The present invention relates to the bus controller 8 and the associated logical circuitry which controls the timing signals on bus. Controller 8 can be conventional except for the additional circuitry hereinafter described. With the present invention, (a) the microprocessor 5 and the bus controller 8 can be driven using different clock signals and the clock signals can be changed under program control during the operation of the system (b) the COMMAND DELAY COUNT can be changed under program control and (c) the WAIT STATE COUNT can be changed under program control.

As is conventional, each CPU cycle is terminated when it receives a ready signal on line 5R. When a local memory cycle is being executed, the ready signal is generated on line 7R by memory controller 7 in a conventional manner. When an I-O instruction or a bus memory instruction is being executed, the ready signal is generated on line 8R by bus controller 8. The manner that bus controller 8 generates a ready signal will be explained with reference to FIG. 2. Either the signal on line 7R or 8R is gated to the microprocessor through an OR circuit 9.

A "40" megahertz signal is provided on input line 12 from a conventional crystal oscillator (not shown). Divider circuits 14 and 15 divide the 40 megahertz signal by two and three to generate "20" and "13.3" megahertz signals. The output of circuits 14 and 15 can be gated to the input of bus controller 8 by gates 103 and 104. Likewise an external timing signal from input line 13 can be gated to bus controller 8 by gate 105.

The timing signal provided to microprocessor 5 is controlled by gates 101 and 102. As shown, the microprocessor 5 either receives the "40" megahertz timing signal provided on input 12 or it receives the same timing signal that is provided to bus controller 8. Gates 101 to 105 are controlled by gating signals G1 to G5 that are generated by control logic 33.

The particular clock signals used to drive bus controller 8 and the microprocessor 5 are determined by the control word in control register 32. An initial value of the desired clock signal is stored in CMOS RAM 21 by a set up program 20. It is conventional for personal computers to have a CMOS memory which retains information when the system is powered off. When the system is turned on, a conventional initialization program (not shown) activates Control Register Loading Program 22 which transfers information from the CMOS memory 21 to the control register 32. After the system is operational, the information in control register 32 can be changed by programs being executed by the microprocessor 5. This is illustrated in FIG. 1 by the box 23 which indicates that Control Register Loading Program 22 can be activated by an Operating Program 23. Register 32 is a conventional control register and as such it can be conventionally accessed.

Control logic 33 also receives signals from a clock level check circuit 30. The operations performed by control logic 33 are shown in FIG. 2. As illustrated by block 201, a switching cycle begins when a new value is loaded into control register 32.

Block 202 indicates that switching only takes place at the end of a CPU cycle. As soon as circuit 30 detects that the timing signal then being used is low, it opens the gate 103, 104 or 105 through which the signal is then passing. As indicated by block 204, the system then waits until the new timing signal is in a low state, at which time it gates the new signal to the bus controller as indicated by block 205. Gates 101 and 102 are operated in the same sequence as that described above in order to change the frequency of the signal to microprocessor 5.

The present invention also makes it possible to vary the COMMAND DELAY signals and the WAIT STATE signals on the bus 10. This is accomplished by the provision of COMMAND DELAY register 36 and WAIT STATE DELAY register 34. These registers are loaded by Control Register Load program 22 from information in either CMOS RAM 21 or in an Operating Program 23 in the same way that clock control register 32 is loaded. Registers 33 and 34 provide inputs to logic 35. Logic 35 performs the operations shown in FIG. 3.

As indicated by block 302, the operation begins at the beginning of a new CPU cycle. Blocks 303 and 304 indicate that when a local memory cycle is being performed, the READY signal on line 7R in FIG. 1 is generated by the memory control circuit 7 at block 304. If a cycle is not a local memory cycle then the remainder of the operations are performed.

Block 305 indicates that the first operation is to synchronize the new cycle to the BUS clock. Line A in FIG. 4 shows the Bus Clock. Line B is an example of when a new cycle might begin. Line C shows how the new cycle is delayed to synchronize it to the Bus clock. Line D shows that the Bus Clock signal is generated by dividing the system clock by 2.

Block 306 in FIG. 3 indicates that after the signals are synchronized an ADDRESS LATCH ENABLE signal is generated. Line D in FIG. 4 shows that the ALE signal is always generated when the bus clock signal is in a low state. As indicated by block 307, a COMMAND signal is next generated after the number of command delays indicated by the information in register 36. FIG. 4 line F shows a COMMAND signal being generated after a command delay of one.

Block 308 indicates that the COMMAND signal is terminated after a time dictated by the WAIT state count in register 34. Finally a READY signal 8R is generated. The READY signal is synchronized to the CPU clock in the same way that the new cycle signal was synchronized to the Bus clock (see lines A, B and C in FIG. 4).

The other parts of Bus Controller 8 are conventional and will not be described here. Likewise the details of logic 33 and 35 are conventional and will not be described further. As is well known, such logic could be implemented with PLA's or with AND OR blocks as is conventional. The bus 10 can be either a PC or an AT bus. The present invention is applicable to both the PC or the AT bus systems.

The present invention is described in a publication entitled "CHIPS, Advanced Information 82C301, 82C302, 82A303, 82A304, 82A305, 82A306, CS8230: AT/386 CHIPSet", commercially available from Chips and Technologies Incorporated, Milpitas, Calif. 95035. The above reference publication is hereby incorporated by reference.

While a particular embodiment of the invention has been shown and claimed, it should be clearly understood that the invention is not limited to the specific embodiment shown herein. Many modifications may be made without departing from the spirit and scope of the invention. The description of a specific embodiment is not meant to limit the scope of the invention. It is contemplated and specifically stated that the applicant's invention covers all such modifications and alternatives to the specific embodiment shown which may fall within the words and spirit of the appended claims. It is to be fully understood that all of the foregoing is intended to be merely illustrative and is not to be construed or interpreted as being restrictive or otherwise limiting of the present invention.

I claim:

1. A bus controller for an I/O bus coupled to a microprocessor, comprising:
   means for providing a bus controller clock signal having a different frequency from a clock for said microprocessor;
   means for monitoring said I/O bus to detect and I/O signal from said microprocessor;
   means responsive to a detected I/O signal from said microprocessor, for providing at least one command signal to said I/O bus, said command signal being synchronized with said bus controller clock signal;
   means for determining completion of an I/O access using said bus controller clock signal; and
   means for providing a ready signal to said microprocessor indicating completion of an I/O access, said ready signal being synchronized with said microprocessor clock.

2. The bus controller of claim 1 wherein said at least one command signal includes:
   an ALE signal having a length which is a multiple of cycle of said bus controller clock signal; and
   an I/O command signal asserted a command delay after said ALE signal, said command delay being a multiple of a cycle of said bus controller clock signal.

3. The apparatus of claim 1 further comprising means for monitoring said microprocessor clock and providing a level signal to said means for providing a ready signal when said microprocessor clock is in a predetermined state.

4. The bus controller of claim 1 further comprising:
   first and second clock input means for providing different clock signals;
   divider means, coupled to said first clock input means, for providing at least a first divided down clock signal having a clock cycle which is a multiple of a clock cycle of a clock signal from said first clock input means;
   first, second and third gates having inputs coupled to said first clock input means, said second clock input means and an output of said divider means, respectively;
   a microprocessor clock signal line coupled to outputs of said first, second and third gating means;
   logic means, having inputs coupled to said first and second clock input means and an output of said divider means, for producing control signals to said gates to enable only one of said gates at a time and to switch the gate which is enabled only when the inputs to the two gates being switched are both in a predetermined state.

5. The bus controller of claim 4 further comprising a fourth gate having an input coupled to outputs of said second and third gates and an output coupled to said microprocessor clock signal line.

6. The bus controller of claim 4 further comprising a bus controller clock signal line coupled to an output of said second and third gates to provide said bus controller clock signal.

7. A bus controller for an I/O bus coupled to a microprocessor, comprising:
   means for providing a bus controller clock signal having a different frequency from a clock for said microprocessor;
   means for monitoring said I/O bus to detect an I/O signal from said microprocessor;
   means, responsive to a detected I/O signal from said microprocessor, for providing an ALE signal and an I/O command signal to said I/O bus, said ALE and I/O command signals being synchronized with said bus controller clock signal, said ALE signal having a length which is a multiple of a cycle of said bus controller clock signal, said I/O command signal being asserted a command delay after said ALE signal, said command delay being a multiple of a cycle of said bus controller clock signal;
   means for providing a ready signal to said microprocessor indicating completion of an I/O access, said ready signal being synchronized with said microprocessor clock;
   means for monitoring said microprocessor clock and providing a level signal to said means for providing a ready signal when said microprocessing clock is in a predetermined state;
   first and second clock input means for providing different clock signals;
   divider means, coupled to said first clock input means, for providing at least a first divided down clock signal having a clock cycle which is a multiple of a clock cycle of a clock signal from said dirst clock input means;
   first, second and third gates having inputs coupled to said first clock input means, said second clock input means and an output of said divider means, respectively;
   a microprocessor clock signal line coupled to outputs of said first, second and third gating means;
   logic means, having inputs coupled to said first and second clock input means and an output of said divider means, for producing control signals to said gates to enable only one of said gates at a time and to switch the gate which is enabled only when the inputs to the two gates being switched are both in a predetermined state.

8. A bus controller for an I/O bus coupled to a microprocessor, comprising:
   means for providing a bus controller clock signal having a different frequency from a clock for said microprocessor;
   means for monitoring said I/O bus to detect an I/O signal from said microprocessor;
   means responsive to a detected I/O signal from said microprocessor, for providing at least one command signal to said I/O bus, said command signal being synchronized with said bus controller clock signal; and
   means for providing a ready signal to said microprocessor indicating completion of an I/O access, said ready signal being synchronized with said microprocessor clock,
   wherein said at least one command signal includes an ALE signal having a length which is a multiple of a cycle of said bus controller clock signal, and an I/O command signal asserted a command delay after said ALE signal, said command delay being a multiple of a cycle of said bus controller clock signal.

9. A bus controller for an I/O bus coupled to a microprocessor, comprising:

means for providing a bus controller clock signal having a different frequency from a clock for said microprocessor;

means for monitoring said I/O bus to detect an I/O signal from said microprocessor;

means responsive to a detected I/O signal from said microprocessor, for providing at least one command signal to said I/O bus, said command signal being synchronized with said bus controller clock signal;

means for providing a ready signal to said microprocessor indicating completion of an I/O access, said ready signal being synchronized with said microprocessor clock;

first and second clock input means for providing different clock signals;

divider means, coupled to said first clock input means, for providing at least a first divided down clock signal having a clock cycle which is a multiple of a clock cycle of a clock signal from said first clock input means;

first, second and third gates having inputs coupled to said first clock input means, said second clock input means and an output of said divider means, respectively;

a microprocessor clock signal line coupled to outputs of said first, second and third gating means; and logic means, having inputs coupled to said first and second clock input means and an output of said divider means, for producing control signals to said gates to enable only one of said gates at a time and to switch the gate which is enabled only when the inputs to the two gates being switched are both in a predetermined state.

* * * * *